US006178933B1

(12) United States Patent
Lavy

(10) Patent No.: US 6,178,933 B1
(45) Date of Patent: Jan. 30, 2001

(54) CONTROLLED SELF-IGNITION COMBUSTION PROCESS AND ASSOCIATED FOUR-STROKE ENGINE WITH RESIDUAL GAS STORAGE VOLUME AND DEDICATED VALVE

(75) Inventor: Jacques Lavy, Guillancourt (FR)

(73) Assignee: Institut Francais Du Petrole, Rueil-Malmaison cedex (FR)

(*) Notice: Under 35 U.S.C. 154(b), the term of this patent shall be extended for 0 days.

(21) Appl. No.: 09/299,083

(22) Filed: Apr. 26, 1999

(30) Foreign Application Priority Data

Apr. 27, 1998 (FR) ........................ 98 05925

(51) Int. Cl.[7] ........................ F02M 25/07

(52) U.S. Cl. ........................ 123/58.8; 123/568.11; 123/568.13

(58) Field of Search ........................ 123/58.8, 316, 123/568.11, 568.12, 568.13

(56) References Cited

U.S. PATENT DOCUMENTS 3,785,355 * 1/1974 Toepel ........................ 123/316
3,789,807 2/1974 Pinkerton ........................ 123/1 R
4,109,625 * 8/1978 Kawamura et al. ........................ 123/568.13
4,156,414 * 5/1979 Kawamura et al. ........................ 123/568.12
4,194,472 * 3/1980 Amano et al. ........................ 123/58.8
4,237,826 * 12/1980 Motosugi et al. ........................ 123/316
4,237,832 * 12/1980 Hartig et al. ........................ 123/58.8
4,282,845 8/1981 Nohira et al. ........................ 123/568.13
4,917,054 * 4/1990 Schmitz ........................ 123/58.8
5,970,944 * 10/1999 Kawamura ........................ 123/316

FOREIGN PATENT DOCUMENTS 3903474 9/1989 (DE).
2078819 11/1971 (FR).

* cited by examiner

*Primary Examiner*—Willis R. Wolfe
(74) *Attorney, Agent, or Firm*—Antonelli, Terry, Stout & Kraus, LLP

(57) ABSTRACT

The present invention relates to a self-ignition combustion process in a four-stroke internal-combustion engine comprising at least one cylinder (1) having at least a first intake (2) and at least a first exhaust. The process according to the invention, at partial load, fills an external volume (10) independent of cylinder (1) with burned gases, the volume (10) being connected to cylinder (1) by a specific port and a specific line (9), and in controlling the flow and/or the pressure of the burned gases in the volume (10) through a throttle 15 (11; 14) associated with a seal allowing selective sealing of the specific port such as a valve (S or S1 and S2). The present invention further relates to a four-stroke engine implementing the above-described process.

27 Claims, 2 Drawing Sheets

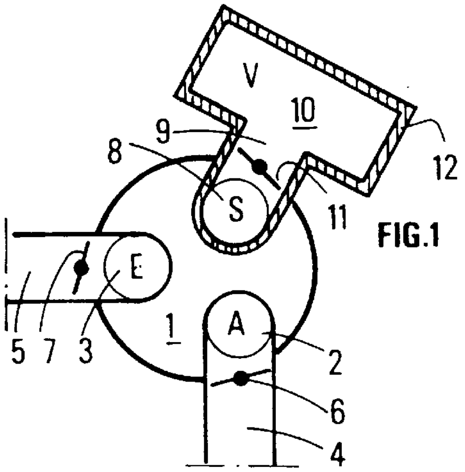
FIG.1
FIG.2
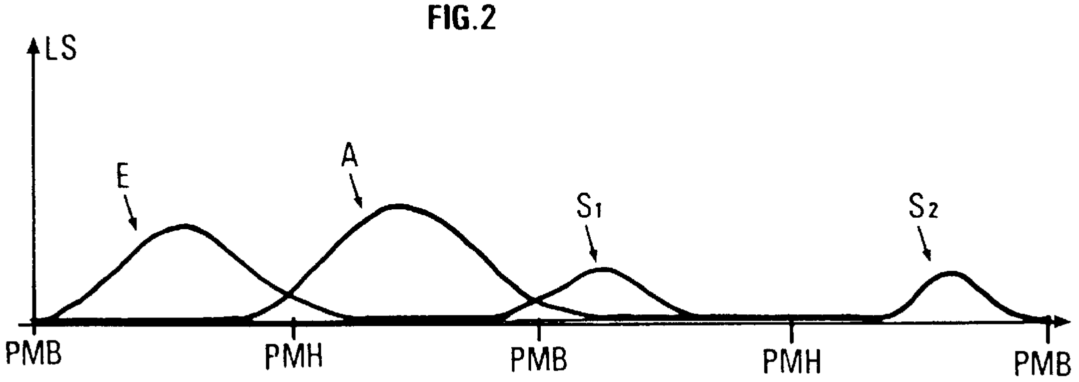

CONTROLLED SELF-IGNITION COMBUSTION PROCESS AND ASSOCIATED FOUR-STROKE ENGINE WITH RESIDUAL GAS STORAGE VOLUME AND DEDICATED VALVE

BACKGROUND OF THE INVENTION

1. Field of the Invention

The present invention relates to controlled self-ignition four-stroke internal-combustion engines.

2. Description of the Prior Art

Controlled self-ignition is a well-known phenomenon in two-stroke engines. This combustion type has advantages as regards emissions: low hydrocarbon and nitrogen oxides emissions are notably obtained. Furthermore, a remarkable cycle regularity is achieved during self-ignition combustion.

Self-ignition is a phenomenon that allows to initiatant of combustion by means of residual burned gases which remain in the combustion chamber after combustion.

Self-ignition is achieved by controlling the amount of residual gases and the mixing thereof with the fresh gases (not burned yet). The residual gases (hot burned gases) initiate the combustion of the fresh gases resultant from a combination of temperature and of presence of active species (radicals).

In two-stroke engines, the presence of residual gases is <<inherent>> in the combustion. In fact, when the load of the engine decreases, the amount of fresh gases decreases, which leads to an increase in the amount of residual gases (burned gases from the previous cycle or cycles which have not flowed out of the cylinder). The two-stroke engine thus works with an internal recirculation (or internal EGR) of the burned gases at partial load. However, the presence of this internal EGR is not sufficient to obtain the desired self-ignition running. Research work also shows that mixing between this internal EGR and the fresh gases has to be controlled and limited.

The controlled self-ignition technology applied to four-stroke engines is particularly interesting because it allows the engine to run with an extremely diluted mixture, with very low fue/air ratios and ultra-low NOx emissions.

However, this technology comes up against a significant technological difficulty insofar as, in order to obtain controlled self-ignition in a four-stroke engine, it is necessary to either significantly increase the compression ratio of the engine (with knocking problems at high load), or to considerably heat up the fresh gases admitted (several hundred degrees C), or to combine these two phenomena.

Solutions allowing the decreasing of pressure and temperature level requirements for four-stroke engines can be partly provided by suitable additives in the fuel. French patent application FR-2,738,594 illustrates a solution of this type.

It is well-known for four-stroke engines, for example from international patent application PCT WO-93/16,276, to combine a variable distribution adjustment with a non-return system at the intake in order to reduce pumping losses at partial load. This solution then allows operation with the intake throttle as wide open as possible.

French patent application EN.97/02,822 filed by the assignee describes another way of controlling self-ignition in a four-stroke engine. More precisely, this document recommends, at partial load, to minimize mixing of the fresh gases and of the burned gases confined in the combustion chamber by delaying closing of the exhaust as much as possible. This is an <<internal>> recycle that allows stratification of the gases in the combustion chamber.

French patent application EN.97/11,279 filed by the assignee also minimized, at partial load, mixing of the fresh gases and of the burned gases contained in the combustion chamber, in order to control and to favor self-ignition combustion. However, this prior art proposes transferring the recycled burned gases via a specific line opening into an air supply line just upstream from the combustion chamber. The fresh air-fuel feed is introduced separately and late via a second line. A successive introduction of the feeds is thus provided. However, this solution creates a substantial dilution of the burned gases by air prior to entering the combustion chamber.

SUMMARY OF THE INVENTION

The present invention proposes a simpler way to obtain, notably at partial load, self-ignition in a four-stroke engine.

Besides, the present invention allows a higher reliability resultant from a better burned gas supply security and a lesser dilution of the burned gases by fresh gases.

The present invention provides a self-ignition combustion process in a four-stroke internal-combustion engine comprising at least one cylinder having at least a first intake and at least a first exhaust.

According to the invention, the process at partial load, fills an external volume independent of the cylinder with burned gases, the volume being connected to the cylinder via a specific port and a specific line, and controls the flow and/or the pressure of the burned gases in the volume through a throttle device associated with a sealing device allowing selective sealing of the specific port such as a valve, in order to achieve stratification of the burned gases and of the fresh gases in the combustion chamber.

According to the invention, the lifting of the specific valve occurs around the end of the intake stroke.

Furthermore, the volume and the specific line(s) are thermally insulated.

According to an embodiment of the invention, the volume is supplied with burned gases coming only from the cylinder.

According to another embodiment of the invention, the volume is supplied with burned gases by means of a n auxiliary engine whose exhaust is connected to the volume.

In accordance with this embodiment of the invention, the lifting of the specific valve is such that it opens during the expansion stroke in order to allow filling of the volume with burned gases.

More particularly, the process can be used in a multicylinder engine having a common exhaust manifold.

The present invention also relates to a four-stroke internal-combustion engine working on the controlled self-ignition principle comprising at least one cylinder having at least a first intake and at least a first exhaust.

The cylinder(s) specifically comprise each a specific port and a specific line connected to a volume exterior to the cylinder and intended, at partial load, to be filled with burned gases. A throttle means is also provided to control the pressure and/or the flow of the gases in the volume, in order to achieve stratification of the burned gases and of the fresh gases in the combustion chamber.

The engine according to the invention can also comprise thermal insulation and/or heating of the specific line and of the volume filled with burned gases.

Without departing from the scope of the invention, the engine can further comprise an auxiliary engine whose exhaust is connected to the volume filled with burned gases. Several cylinders having a common exhaust manifold are then provided.

BRIEF DESCRIPTION OF THE DRAWINGS

Other features, details and advantages of the invention will be clear from reading the description hereafter, given by way of non limitative example, with reference to the accompanying drawings wherein:

FIG. 1 is a diagrammatic section of an embodiment of the invention,

FIG. 2 relates to the lifting of the valves of an engine according to FIG. 1.

DETAILED DESCRIPTION OF THE INVENTION

Figure 3:
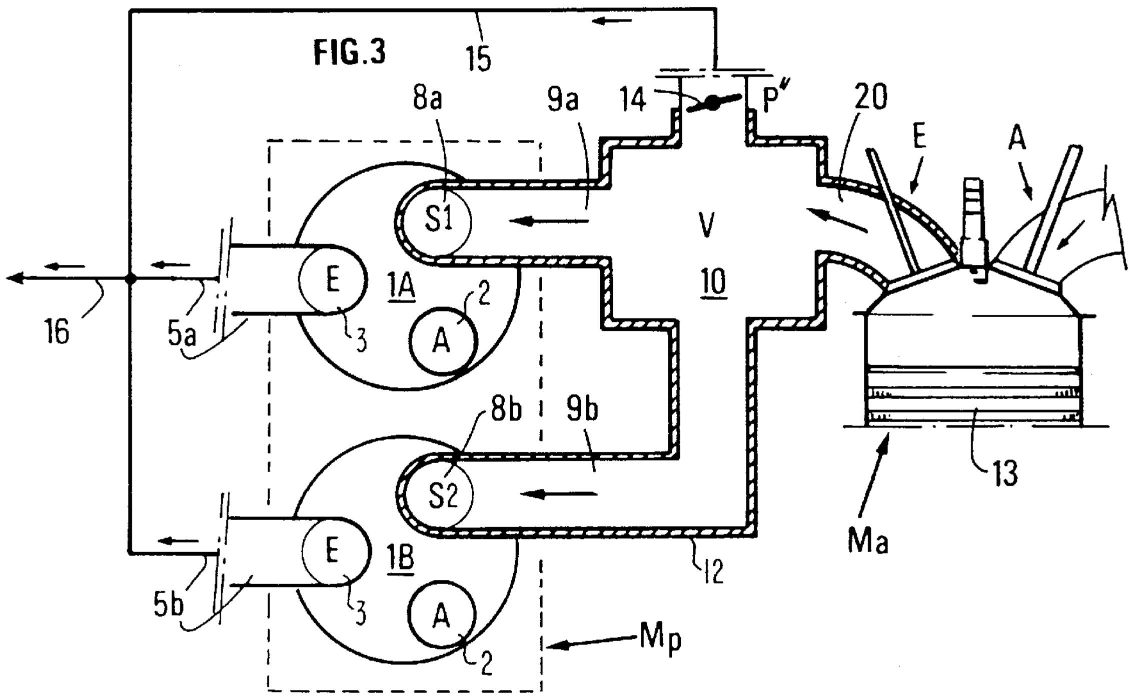
FIG. 3 is a simplified diagrammatic view of another embodiment of the invention, and FIG. 4 relates to the lifting of the valves of an engine according to FIG. 3. Like reference numerals identify like parts throughout the disclosure.

FIG. 1 thus is a diagrammatic cross-section of the upper part of a combustion chamber 1 of a four-stroke engine.

Combustion chamber 1 conventionally comprises an intake means 2 and an exhaust 3. The intake is the intake port itself and the associated valve A that intermittently seals the intake port.

Similarly, the exhaust is the exhaust port and the associated valve that intermittently seals the exhaust port.

The intake pipe 4 provides the feed into combustion chamber 1, into which it opens through the intake port 2.

An exhaust pipe 5 allows the burned gases to be extracted from combustion chamber 1.

A first throttling device 6 can be placed in intake pipe 4, close to intake port 2, in order to control the flow of gas; similarly, a second throttling device 7 can be placed in exhaust pipe 5.

According to the present invention, a specific port 8 is provided in the cylinder or in the cylinder head ; it is associated with a valves and the values and it constitutes the first end of a line 9 opening into a volume 10 at the other end thereof.

Line 9 can be equipped with a throttling device 11.

The invention works as follows: the valves first opens during the expansion stroke, thus allowing filling of volume 10 with burned gases. The values then closes when the desired amount is confined in volume 10.

Thereafter, during the intake or compression stroke, the specific values opens again at a time when the pressure in the cylinder is lower than the pressure in volume 10. This allows the burned gases to be transferred from volume 10 to cylinder 1.

FIG. 2 shows lifting of the various valves: curve E is the lift of exhaust valve E, curve A that of intake valve A, whereas valve S has two successive lifts $S_1$ and $S_2$ as explained above.

The burned gases are preferably re-introduced into the combustion chamber as late as possible in the cycle so as to limit mixing with the fresh gases. In fact, such a stratification is always sought because it favours the combustion process.

Similarly, the cam (or any other control of the motion of the valves) must have a variable (in amplitude, length, phasing) distribution in order to best control the burned gases confined in volume 10.

To this end, a throttling device such as a throttle blade 11 is placed in line 9 if the lifting of the valves does not allow such a flow control.

At high load, the valves does not open.

Furthermore, volume 10 and/or line 9 can be thermally insulated by insulation 12 in order to take advantage of the initial temperature of the burned gases for self-ignition of the fresh feed. Similarly, a heating system such as a wound resistor for example can be placed near line 9 and/or volume 10. However, as the latter solution is energy-consuming, it will be implemented only occasionally.

The embodiment of the invention described above relates to single-cylinder engines, but it can also be implemented in multicylinder engines where each cylinder comprises a specific valves cooperating with a volume 10.

FIG. 3 relates to an embodiment that is applicable to multicylinder engines. It differs from the previous embodiment in that volume 10 is <<common>> to several cylinders 1A, 1B. In fact, several lines 9*a* and 9*b* end up into common volume 10.

Furthermore, volume 10 is connected to the exhaust of an auxiliary engine 13 thus supplying volume 10 with burned gases.

An additional line 15 bypassing the various cylinders can also be provided; it opens into volume 10 by a first end and, by its second end, for example into an exhaust manifold 16 common to all the cylinders 1A, 1B, . . . .

A throttling device 14 is preferably placed close to the first end of line 15 in order to control the pressure in volume 10 and thus the amount of burned gases introduced into the cylinders of the main engine, notably in the compression cycle, while each specific valve S1 and S1 . . . is open in the parts 8*a* and 8*b* respectively.

As in the previous embodiment, each valve S1, and S2 is preferably provided with a variable (lift, phasing) distribution device in order to better control the flows and pressures. At high load, when introduction of burned gases is not necessary, the dedicated valves must not open.

Figure 4:
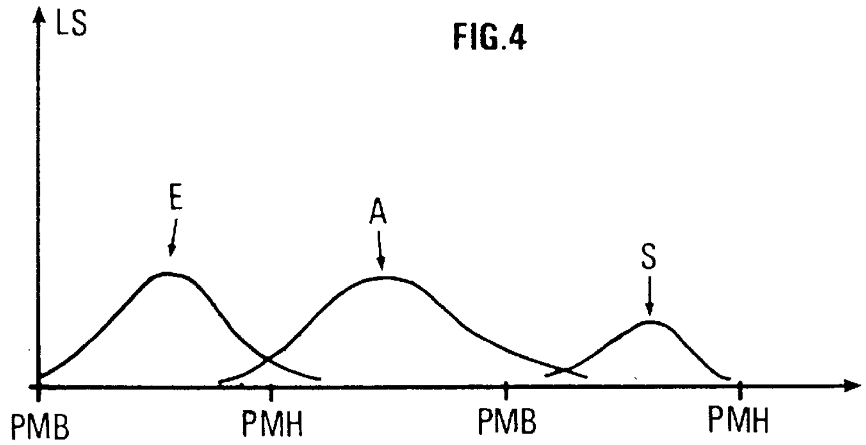

FIG. 4 shows the lifting for the various valves: the exhaust valve follows curve E, i.e. it opens conventionally between the bottom dead center (BDC) and the top dead center (TDC), whereas the intake valve opens between the top dead center and bottom dead center. As for the specific valve, it opens later around bottom dead center, about the end of the intake stroke.

Thermal insulation 12 and/or a heater means 12 can also be provided around volume 10, line 20 and specific lines 9*a*, 9*b*.

The mechanical power supplied by auxiliary engine 13 will be advantageously used to drive auxiliaries, a compressor and/or it can be retransmitted to the main engine.

What is claimed is:

1. A self-ignition combustion process in a four-stroke internal-combustion engine having at least one cylinder, at least a first intake and at least a first exhaust comprising:

at partial load, filling a volume external of the at least one cylinder with burned gases, the external volume being connected to the at least one cylinder via at least one port and at least one line;

providing fresh gases in the at least one cylinder; and controlling at least one of flow and/or pressure of the burned gases from the external volume past a throttling device and a sealing device, which provides selective sealing of the at least one port, to produce stratification of the burned gases and of the fresh gases in the at least one cylinder.

2. A combustion process as claimed in claim 1, wherein:

the volume external to the at least one cylinder is supplied with burned gases from an auxiliary engine having an exhaust connected to the volume.

3. A combustion process as claimed in claim 1 wherein:

the internal combustion engine is a multicylinder engine having a common exhaust manifold and the stratification of the burned gases and fresh gases occurs in each cylinder.

4. A combustion process as claimed in claim 1, wherein:

the volume external to the at least one cylinder is supplied with burned gases coming only from the at least one cylinder.

5. A combustion process as claimed in claim 4, wherein:

the volume external to the at least one cylinder is supplied with burned gases from an auxiliary engine having an exhaust connected to the volume.

6. A combustion process as claimed in claim 1, wherein:

the volume external of the at least one cylinder and the at least one line are thermally insulated.

7. A combustion process as claimed in claim 6, wherein:

the volume external to the at least one cylinder is supplied with burned gases from an auxiliary engine having an exhaust connected to the volume.

8. A combustion process as claimed in claim 6, wherein:

the volume external to the at least one cylinder is supplied with burned gases coming only from the at least one cylinder.

9. A combustion process as claimed in claim 8, wherein:

the volume external to the at least one cylinder is supplied with burned gases from an auxiliary engine having an exhaust connected to the volume.

10. A combustion process as claimed in claim 1, wherein:

the sealing device is at least one valve; and an opening of the at least one valve occurs around an end of an intake stroke.

11. A combustion process as claimed in claim 10, wherein:

the at least one valve opens during an expansion stroke during which filling of the volume external to the at least one cylinder with burned gases occurs.

12. A combustion process as claimed in claim 10, wherein:

the volume external to the at least one cylinder is supplied with burned gases from an auxiliary engine having an exhaust connected to the volume.

13. A combustion process as claimed in claim 12, wherein:

the at least one valve opens during an expansion stroke during which filling of the volume external to the at least one cylinder with burned gases occurs.

14. A combustion process as claimed in claim 10, wherein:

the volume external to the at least one cylinder is supplied with burned gases coming only from the at least one cylinder.

15. A combustion process as claimed in claim 14, wherein:

the volume external to the at least one cylinder is supplied with burned gases from an auxiliary engine having an exhaust connected to the volume.

16. A combustion process as claimed in claim 14, wherein:

the at least one valve opens during an expansion stroke during which filling of the volume external to the at least one cylinder with burned gases occurs.

17. A combustion process as claimed in claim 10, wherein:

the volume external of the at least one cylinder and the at least one line are thermally insulated.

18. A combustion process as claimed in claim 17, wherein:

the volume external to the at least one cylinder is supplied with burned gases from an auxiliary engine having an exhaust connected to the volume.

19. A combustion process as claimed in claim 17, wherein:

the at least one valve opens during an expansion stroke during which filling of the volume external to the at least one cylinder with burned gases occurs.

20. A combustion process as claimed in claim 17, wherein:

the volume external to the at least one cylinder is supplied with burned gases coming only from the at least one cylinder.

21. A combustion process as claimed in claim 20, wherein:

the volume external to the at least one cylinder is supplied with burned gases from an auxiliary engine having an exhaust connected to the volume.

22. A four-stroke internal-combustion engine using controlled self-ignition comprising:

at least one cylinder having at least a first intake through which fresh gases flow into the at least one cylinder and at least one exhaust, each cylinder having a port and a line connected to a volume exterior to the at least one cylinder which, at partial load, is filled with burned gases;

a throttling device which controls at least one of flow and/or the pressure of the burned gases from the volume exterior to the at least one cylinder into the at least one cylinder to produce stratification of the burned gases and fresh gas in the at least one cylinder.

23. A four-stroke internal-combustion engine as claimed in claim 22, further comprising:

at least one of thermal insulation of the volume external to the at least one cylinder or heater of the line.

24. A four-stroke internal-combustion engine as claimed in claim 23, further comprising:

an auxiliary engine having an exhaust connected to the volume external to the at lease one cylinder which provides the burned gases.

25. A four-stroke internal-combustion engine as claimed in claim 23 wherein:

the at least one cylinder comprises a plurality of cylinders having a common exhaust manifold.

26. A four-stroke internal-combustion engine as claimed in claim 24 wherein:

the at least one cylinder comprises a plurality of cylinders having a common exhaust manifold.

27. A four-stroke internal-combustion engine as claimed in claim 25 wherein:

the at least one cylinder comprises a plurality of cylinders having a common exhaust manifold.

* * * * *